(12) United States Patent
Kaminsky et al.

(10) Patent No.: US 6,900,941 B2
(45) Date of Patent: *May 31, 2005

(54) LIGHT DIFFUSER WITH COLORED VARIABLE DIFFUSION

(75) Inventors: Cheryl J. Kaminsky, Rochester, NY (US); Robert P. Bourdelais, Pittsford, NY (US); John M. Pochan, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/147,659

(22) Filed: May 16, 2002

(65) Prior Publication Data

US 2003/0214717 A1 Nov. 20, 2003

(51) Int. Cl.$^7$ .................................. G02B 5/02
(52) U.S. Cl. .................. 359/599; 359/619; 359/707
(58) Field of Search .................. 359/599, 613–614, 359/619–624, 626, 454–456, 707; 349/112–113, 62, 64, 67, 95; 362/31

(56) References Cited

U.S. PATENT DOCUMENTS

| | | | | | |
|---|---|---|---|---|---|
| 2,706,262 A | * | 4/1955 | Barnes | .................. | 313/478 |
| 3,968,584 A | * | 7/1976 | Kingston | .................. | 40/546 |
| 4,673,254 A | * | 6/1987 | Kato et al. | .................. | 359/599 |
| 5,134,549 A | * | 7/1992 | Yokoyama | .................. | 362/31 |
| 5,600,455 A | * | 2/1997 | Ishikawa et al. | .................. | 349/57 |
| 5,696,630 A | * | 12/1997 | Hayashi | .................. | 359/599 |
| 5,706,134 A | * | 1/1998 | Konno et al. | .................. | 359/599 |
| 6,093,521 A | * | 7/2000 | Laney et al. | .................. | 430/363 |
| 6,130,777 A | * | 10/2000 | Yamashita et al. | .................. | 359/456 |
| 6,266,476 B1 | | 7/2001 | Shie et al. | .................. | 385/147 |
| 6,339,458 B1 | * | 1/2002 | Ohkawa | .................. | 349/65 |
| 6,381,068 B1 | | 4/2002 | Harada et al. | .................. | 359/500 |

OTHER PUBLICATIONS

R. P. Bourdelais, et al, "Light Diffuser with Variable Diffusion", USSN 10/147,703, (D–83948) filed May 16, 2002.
C. J. Kaminsky, et al., "Increased Contrast Overhead Projection Films", USSN 10/279,599, (D–84928) filed Oct. 24, 2002.
C. J. Kaminsky, et al., "Reflection Media for Scannable Information System", USSN 10/279,584, (D–84929) filed Oct. 24, 2002.
R. P. Bourdelais, et al., "Light Management Film with Colorant Receiving Layer", USSN 10/279,557, (D–84987) filed Oct. 24, 2002.

* cited by examiner

*Primary Examiner*—Mark A. Robinson
*Assistant Examiner*—Lee Fineman
(74) *Attorney, Agent, or Firm*—Arthur E. Kluegel

(57) ABSTRACT

The invention provides a light diffuser comprising a macro diffusion efficiency variation wherein at least part of the diffuser is colored. The invention also provides light diffuser comprising a macro diffusion efficiency variation wherein at least part of the diffuser is colored for rear projection displays, back-lighted imaging media, and a liquid crystal display component and device. The invention further provides a process for preparing such a diffuser.

38 Claims, 4 Drawing Sheets

LIGHT DIFFUSER WITH COLORED VARIABLE DIFFUSION

CROSS REFERENCE TO RELATED APPLICATIONS

This application is one of a group of five applications co-filed under application U.S. Ser. Nos. 10/147,703; 10/147,776; 10/147,777; 10/147,775; and 10/147,659; the contents of which are incorporated herein by reference.

FIELD OF THE INVENTION

The invention relates to a colored variable diffuser for specular light. In a preferred form, the invention relates to a colored variable back light diffuser for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need for a separate film. In the case of light management in a LCD, this increases efficiency by removing an interface (which causes reflection and lost light).

It is desirable to have the amount of diffusion vary across the diffusion film, whether a bulk or surface diffuser, to compensate for uneven brightness across a backlit display. A diffuser film with uniform diffusion across the film must have the diffusion efficiency to diffuse the most intense, specular areas of the display across the entire diffuser. These diffusers tend to need high levels of diffusion efficiency causing lower percentages total transmission across the entire film. With a diffuser with variable diffusion efficiency, the areas of high specular light could be diffused more than areas of less specular light. The result would be a display that had even diffuse light across it while having a higher overall transmission value compared to the uniform diffusion film.

The colored variable diffusion film evens out the color and illumination of the backlight across the display using a gradient in color tone, color density, and diffusivity. For a backlight with the light source in the center of the display, the percent total light transmission would increase and diffuse light transmission would decrease from the center of the roll to the edge of the roll. The film would be more diffuse and less transparent in the center of the display where the light is located, to compensate for the light intensity of the light bulb. Towards the edge of the film and display, away from the light source, more light passes through the film and the light is diffused less to create an even light intensity across the entire display. Selective coloration of the variable diffuser creates an even color tone across the display by using higher density color close to the light source and lower color density away from the light to create an even color across the display. Using colored variable diffusers even illumination and color across the display can be achieved.

In U.S. Pat. No. 6,270,697 (Meyers et al.), blur films are used to transmit infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. The materials disclosed in U.S. Pat. No. 6,266,476 shape and collimate light, and therefore are not efficient diffusers of light particularly for liquid crystal display devices.

It is known to produce a base having a resin coated on one surface thereof with the resin having a surface texture. This kind of base is made by a thermoplastic embossing process in which raw (uncoated) base is coated with a molten resin, such as polyethylene. The base with the molten resin thereon is brought into contact with a chill roller having a surface pattern. Chilled water is pumped through the roller to extract heat from the resin, causing it to solidify and adhere to the base. During this process the surface texture on the chill roller's surface is embossed into the resin coated base. Thus, the surface pattern on the chill roller is critical to the surface produced in the resin on the coated base.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

In U.S. Pat. No. 6,381,068 (Harada et al.) the diffusing element may be a bulk diffuser including a transparent base material of and at least one light-diffusing material, such as a pigment and/or beads, dispersed in the transparent base material. The pigments used may include a white pigment (for example, titanium oxide) and may also include one or more colored pigments. The pigments in this invention are only used with a uniform diffuser and not a variable diffuser.

Furthermore, the colored pigments must be a single color tone and density across the display. The colored variable diffuser can tailor the color and diffusion properties of the film as a function of location on the film with varying colors and densities across the film.

In U.S. Pat. No. 6,266,476 (Shie et al.) a monolithic element having a substrate body and a macro-optical characteristic produced by surface micro-structures. These micro-structures can be non-uniform across the lens to minimize certain lens aberrations. These non-uniform micro-structures reduce lens aberrations, but are not able to significantly alter the macro-optical characteristics of the optical body. The diffusing structures, in this invention, vary as to change the macro diffusion efficiency across the diffusion film. The diffusion elements can vary changing the diffusion characteristics of the diffusion area from diffusing most of the light to letting light pass specularly which micro-structures are unable to do.

U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

U.S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptable reduce the brightness of the LC device.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission that is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

PROBLEM TO BE SOLVED BY THE INVENTION

There remains a need for an improved provide colored light transmission while simultaneously diffusing specular light sources.

SUMMARY OF THE INVENTION

The invention provides a light diffuser comprising a macro diffusion efficiency variation wherein at least part of the diffuser is colored. The invention also provides light diffuser comprising a macro diffusion efficiency variation wherein at least part of the diffuser is colored for rear projection displays, back-lighted imaging media, and a liquid crystal display component and device. The invention provides a process comprising color transfer.

ADVANTAGEOUS EFFECT OF THE INVENTION

The invention provides colored transmission for a back lit display while simultaneously diffusing specular light sources. It also provides colored variable diffusers for display media.

DETAILED DESCRIPTION OF THE INVENTION

Figure 1:
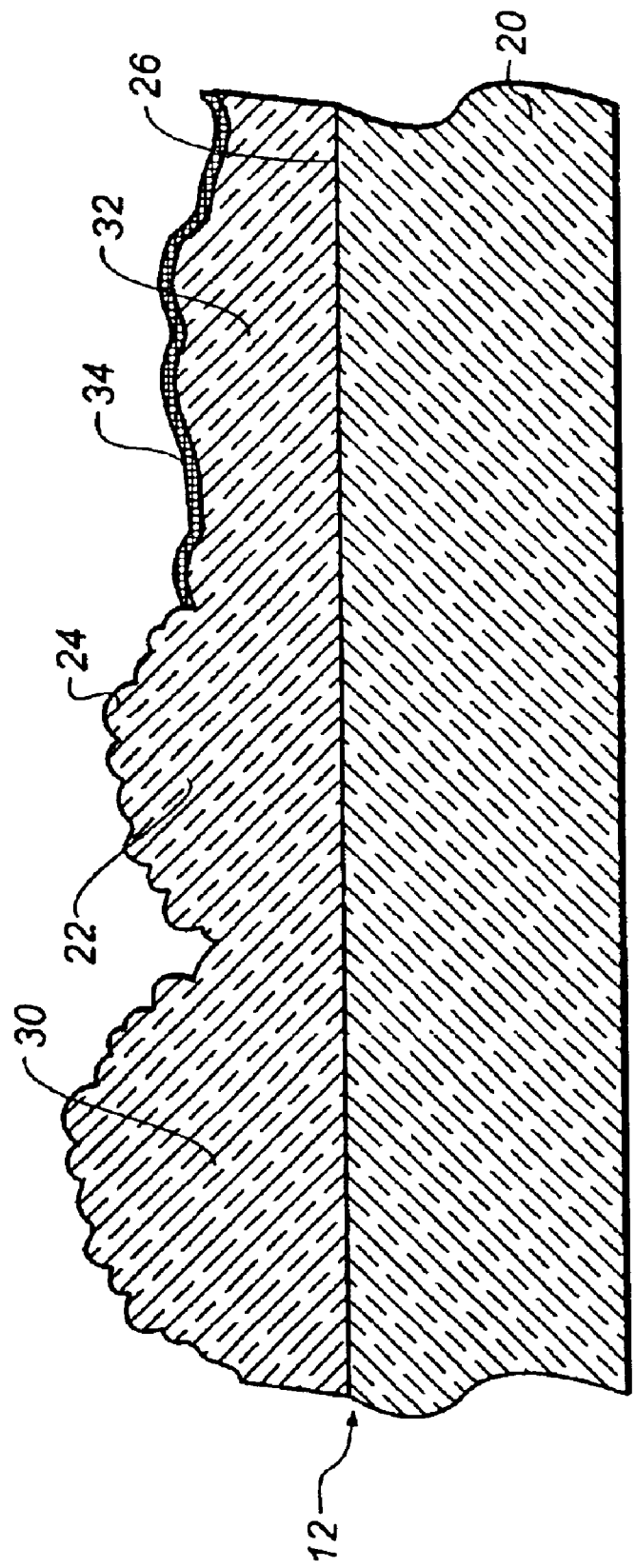
FIG. 1 illustrates a cross section of a colored variable diffusion complex lens formed on a base material suitable for use in a liquid crystal display device.

The invention has numerous advantages over prior practices in the art. The prior art diffusion screen, uniform across the film surface, could not tailor the light transmission, diffusion, and color as a function of position on the film. The colored variable diffusion film can be designed to the light source and the display. The colored variable diffusion film evens out the color and illumination of the backlight across the display using a gradient in color tone, color density, and diffusivity. For a display with the light source in the center of the display, the percent total light transmission would increase and diffuse light transmission would decrease from the center of the roll to the edge of the roll. The film would be more diffuse and less transparent in the center of the display where the light is located, to compensate for the light intensity of the light bulb. Towards the edge of the film and display, away from the light source, more light passes through the film and the light is diffused less to create an even light intensity across the entire display. Selective coloration of the variable diffuser creates an even color tone across the display by using higher density color close to the light source and lower color density away from the light to create an even color across the display. Using colored variable diffusers even illumination and color across the display can be achieved.

A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The invention can be easily changed to achieve the desired diffusion, diffusion variation, and light transmission requirements for many liquid crystal devices thus allowing the invention materials to be responsive to the rapidly changing product requirements in the liquid crystal display market.

A voided polymer diffuser and a complex lens surface diffuser can be easily altered in both pre and post-manufacturing processes to achieve the desired variable diffusion, light transmission, and color requirements for many liquid crystal. These technologies allow the invention materials to be responsive to the rapidly changing product requirements in the liquid crystal display market.

Further, the light diffuser with efficiency variation can create patterns, text, and pictures by diffusing light selectively to create areas of diffusion, less diffusion, and no diffusion (specular). The colored variable diffuser can display text, shapes, and images in varying amounts of diffusion or specular areas and different colors surrounded by diffuse regions. These colored variable diffusers can be used in displays and as overheads. As overheads the colored variable diffuser has added utility. In an unexpected result, when the colored variable diffuser was placed on an overhead projector, the diffuse areas were dark, and the specular areas were bright. This occurred because when the light from the light source in the overhead projector hit the diffuse areas of the diffuser sheet, the light was diffused and the focusing lens did not collect the light and the image projected was dark. The specular areas transmitted specular light producing bright areas on the display. Colored variable diffusion sheets, with there ability to produce colored text, shapes, and images with diffuse and specular areas, can be used as project materials to improve the contrast in the projected sheet allowing the display to be more easily read in a bright room and producing for an unusual display effect.

The diffusion film of the present invention can be produced by using a conventional film-manufacturing facility in high productivity using roll to roll manufacturing processes. These and other advantages will be apparent from the detailed description below.

Color can be applied by any method, for example inkjet, flexo printing, gravure printing, screen printing, electrophotography, and thermal dye sublimation. The coloration techniques can apply heat and pressure to change the characteristics of the diffusion film, or not apply heat and pressure and apply to an diffusion film with variable diffusion efficency.

The term "LCD" means any rear projection display device that utilizes liquid crystals to form the image. The term "diffuser" means any material that is able to diffuse specular light (light with a primary direction) to a diffuse light (light with random light direction). "Specular" means light with a primary direction and a haze value of 15% or less. The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffusion efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area. "Diffuse areas" means areas in a film where the haze of the light transmitted is more than 15%. "Specular areas" means areas in a film where the haze of the light transmitted is 15% or less.

"Transparent" means a film with total light transmission of 50% or greater at 500 nm. "In any direction", with respect to lenslet arrangement on a film, means any direction in the x and y plane. The term "pattern" means any predetermined arrangement whether regular or random.

"Macro diffusion efficiency variation" means a diffusion efficiency variation that is greater than 5% over an in plane distance of at least 2 cm. An optical gradient is a change in optical properties such as transmission, reflection, light direction as a function of distance from a stating point. Useful examples of an optical gradient include a light transmission gradient, a light diffusion gradient and light adsorption gradient. "Gradient", in reference to diffusion, means the increasing or decreasing of diffusion efficiency relative to distance from a starting point. "Colored macro diffusion efficiency variation" and "colored variable diffusers" means a diffuser that has a macro diffusion efficiency variation and at least part of the diffuser is colored. "Color" and "chromatic" mean light in the visible wavelengths (approximately 400–750 nanometers) that are seen by the viewer as having coloration.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

The back diffuser is placed directly in front of the light source and is used to even out the light throughout the display by altering specular light into diffuse light. Prior art methods for diffusing LCD back light include layering polymer films with different indexes of refraction, microvoided polymer film, micro surface structures, or coating the film with matte resins or beads. The role of the front diffuser is to broaden the light coming out of the liquid crystal (LC) with directional selectivity. The light is compressed into a tight beam to enter the LC for highest efficiency and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality.

In one embodiment of the invention, the diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of. "Minor lenses" mean lenses smaller than the major lenses that are formed on the major lenses. The plurality of lenses of all different sizes and shapes are formed on top of one another to create a complex lens feature resembling a cauliflower. The lenslets and complex lenses formed by the lenslets can be concave into the base or convex out of the base. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

The term "polymer" means homo- and co-polymers. The term microbead means polymeric spheres typically synthesized using the limited coalescence process. These microbead spheres can range in size from 0.2 to 30 micrometers. They are preferably in the range of 0.5 to 5.0 micrometers. The term microvoids means pores formed in an oriented polymeric film during stretching. These pores are initiated by inorganic particles, organic particles, or microbeads. The size of these voids is determined by the size of the particle or microbeads used to initiate the void and by the stretch ratio used to stretch the oriented polymeric film. The pores can range from 0.6 to 150 $\mu$ms in machine and cross machine directions of the film. They can range from 0.2 to 30 micrometers in height. Preferably the machine and cross machine direction pore size is in the range of 1.5 to 25 micrometers. Preferably the height of the pores is in the range of 0.5 to 5.0 micrometers. The term substantially circular means indicates a geometrical shape where the major axis is no more than two times the minor axis.

It has been shown that a colored variable diffuser film can tailor the light source in diffusivity and coloration with respect to location on the film. It has been shown that the most efficient colored diffuser films would have higher diffusion values and color density near the light sources to destruct the light source shape and perform color correction and less diffusion and color density away from the light source. Having a light diffuser with colored macro diffusion efficiency enables the diffuser to tailor the diffusion, transmission, and color properties as a function of location on the diffuser film. In a back-lit display, when the diffusion film is tailored to the needs of the backlight, higher light transmission and diffusion efficiency and more even color tone can be achieved. It has been shown that selective coloration of the variable diffuser creates an even color tone across the display. For example, a display might have a red tint to it and the desire is to have a neutral display. The diffuser for the light source would need to have a cyan component to it, higher in density close to the light source and lower in density away from the light to create an even color across the display. Using colored variable diffusers displays can be fabricated with even illumination and color across the display.

Further, a light diffuser with colored macro efficiency variation can eliminate the need for edge printing on the diffusion film and dot printing on the acrylic light guide. These printing devices were to guide the light through back light of an LCD to be used more efficiently by the liquid crystal and to "hide" the light sources from the viewer. Further, the light diffuser with efficiency variation can create patterns, text, and pictures by diffusing light selectively to create areas of diffusion, less diffusion, and no diffusion (specular). This can create differentiated backlit media such as backlit display, greeting cards, and printed media.

Preferably, the colored light diffuser has a color with at least the density of 0.2. A color density of less than 0.1 could be caused by coloration in the materials and could vary due to manufacturing processes. A color density of 0.2 is enough density to be used in display media and as color correction for light sources.

It is preferred that the specular areas of the macro efficiency variation are colored. This creates text, graphics, shapes, and images in specular colored areas surrounded by diffuse regions creating media that can become display media or overhead projection films, for example. Preferably, the diffuse areas of the macro efficiency variation are colored because the film can color light transmitted diffusely. This can be used to color correct lighting for artwork or anywhere that the variable diffuser would need coloration. Furthermore, the color tone and density can change over the diffuse regions of the film. In another embodiment of the invention, diffusion gradient areas of the macro efficiency variation are colored. In this embodiment, the gradient from specular to diffuse regions of the film are colored with a uniform or varying color tone and density. This creates unique display and lighting effects and can be used in the backlight assemblies of LC displays for color tone and illumination evening.

The colored macro diffusion efficiency variation comprising dye based colorants is preferred. Dye based colorants are preferred because of the ease of application to the variable diffuser films. They are relatively inexpensive and have a large color gamut. Dye can be applied to the diffuse film, for example, by inkjet, thermal dye sublimation, and screen printing. A dye is a colorant, which is dissolved in the carrier medium. Any dye may be used in this invention. Preferably, any anionic, water-soluble dye may be used such as a dye having an anionic group, e.g., a sulfo group or a carboxylic group. The anionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. A Mixture of dyes may also be used.

The colored macro diffusion efficiency variation comprising pigment based colorants is preferred. Pigment based colorants are preferred because of the ease of application to the variable diffuser films and for the image stability of the pigments. Pigments can be applied to the diffuse film, for example, by inkjet, thermal dye sublimation, and screen printing. In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The pigment can be a colored pigment, or a black colored pigment, such as carbon black. The exact choice of pigment, or mixture of pigments, will depend upon the specific color reproduction and image stability requirements of the printer and application.

Preferably, the colored light diffuser comprises fluorescent materials. An optical brightener is substantially colorless, fluorescent, organic compound that absorbs ultraviolet light and emits it as visible blue light.

Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. Because the ultraviolet source for a transmission display material is on the opposite side of the LC, the ultraviolet light intensity is not reduced by ultraviolet filters common to polarizers. The result is less optical brightener is required to achieve the desired background color. This can create coloration in the variable diffuser.

Preferably, the macro diffusion efficiency variation corresponds to a color wavelength band of 10 to 70 nanometers wide. This creates a colored variable diffuser with a very specific narrow color band. Having a narrow color band can very selectively transmit or block light of varying wavelengths tailoring the light. It has been shown that producing a narrow color band of light creates a more "pure" color of light and is more efficient for use in liquid crystal display color matrixes because the red, green, and blue color filters only transmit specific wavelengths of light.

The light diffuser where the colored macro diffusion efficiency variation comprises text is preferred. In another embodiment of the invention, the colored macro diffusion efficiency variation comprising graphics are preferred. Preferably, the colored macro diffusion efficiency variation comprises images. The colored variable light diffuser can have areas of text, graphics, and images in selected amounts of diffusion. For example, areas of diffuse text can be surrounded by specular colored areas or an image can be formed where all areas of white of the image are diffuse and the colored areas of the image are semi-diffuse to specular colored. This creates unique display media such as backlit displays, display media, overheads, and greeting cards.

The light diffuser comprising a colored element is preferred. This colored element can produce colored transmissions or correct the coloration of the light source. Or example, if a display required neutral colored light and the light source used was blue in color, a yellow colored element could be added to the diffuser so that the transmission of the diffuser would be neutral and more suited to the display. "Colored element" means any colored material, a substance, such as a dye, pigment, or paint that imparts a hue.

A light diffuser wherein the macro diffusion efficiency variation comprises chromatic transmission is preferred. To obtain chromatic transmission, different wavelengths that compose white light are affected differently by refraction. For example, the red radiation (with longer wavelengths) are less deviated while the blue or violet radiation are more deviated from their initial direction and this creates a chromatic transmission.

The light diffuser wherein the chromatic transmission comprises yellow light at 570 to 620 nm is preferred. In another embodiment of the invention, the chromatic transmission comprises magenta light at 630 to 690 nm and 425 to 480 nm is preferred. Preferably, the chromatic transmission comprises cyan light at 480 to 520 nm. In another embodiment of the invention, the chromatic transmission comprises red light at 630 to 690 nm. The preferred diffuse transmission comprises green light at 525 to 590 nm. For another application, the preferred diffuse transmission comprises blue light at 425 to 480 nm. The desired chromatic transmission color depends on the application and use.

A light diffuser wherein the diffusion efficiency varies more than 5 percent in two different locations of the diffuser is preferred. A diffusion efficiency that varies less than 3 percent could be caused by variations in the diffusion film caused by manufacturing process variations. Most preferred is a diffusion efficiency that varies more than 50 percent in two different locations of the diffuser. It has been shown that over 50 percent variation in two different locations of the diffuser film produces a film that can be tailored to diffusing needs of the backlight.

A light diffuser wherein the diffusion efficiency variation comprises a gradient is preferred. Having a gradient allows for the smooth transition from one diffusion efficiency to another diffusion efficiency. For example, in a liquid crystal display, it is desirable to have more diffusion by the light source because the light is more intense and specular in that region, however, it is not desirable for the viewer to see the transition in the diffusion film. A gradient allows that transition to be undetectable by the viewer. The diffusion efficiency can change by the following mathematical variations, for example:

Diffusion efficiency=$e^{1/distance}$ or $e^{-1/distance}$

Diffusion efficiency=1/distance or −1/distance

Diffusion efficiency=distance*$x$ or −distance*$x$ (where x is a real number)

Each specific light diffusing application determines the amount of variation needed and the rate at which diffusion efficiency changes with respect to distance.

The diffusion film is tailored to the backlight and the light source to be diffused. Typically, to produce an evenly lit display, there need to be more diffusion near the light source and less further away from the light source. Where the light source is positioned in relation to the display determines what variable diffuser is needed. The preferred light diffuser that is rectangle is shape has a diffusion efficiency variation along a diagonal of the rectangle. This would be desirable to compensate for a lighting variation on a diagonal of a rectangle. In another embodiment of the invention, the preferred light diffuser that is rectangular in shape has a diffusion efficiency variation along the width or height of the rectangle. For another application, the preferred light diffuser has a diffusion efficiency variation from the center to the perimeter of the diffusion film. Preferably, the light diffuser has a diffusion efficiency variation along the perimeter of the diffusion film. The preferred light diffuser has a diffusion efficiency variation such that the iso-efficiency exhibits an elliptical pattern. The preferred light diffuser has a diffusion efficiency variation having a pattern. The variable diffusion film can take on any of these variations based on the backlight and display configuration.

For example, prior art light diffusers for liquid crystal display devices utilize edge or perimeter printing of the light diffuser to direct light away from the edges of the display were the light is typically absorbed into the LCD frame. Light adsorbed into the LCD frame is lost light energy in that absorbed illumination light energy can not be used to illuminate the LC image. Prior art diffusers for LCD devices are typically printed with white or silver, reflecting dots around the perimeter that provide specular reflection of perimeter light so that some of the perimeter light can be "recycled" by the illumination components away from the perimeter. While the printing of white reflective dots does reduce the amount of absorbed light energy by the LCD frame, perimeter printing is expensive in that it required an additional printing operation. Further, the perimeter printing of the light diffuser has been generally shown to reduce edge absorption by 30%. Using less diffuse region (a more specular region) around the perimeter of the diffusion film, more of the light would be directed straight out of the backlight and into usable space on the display instead of being directed towards the edge of the display and being lost.

Preferably, the light diffuser has a diffusion efficiency variation having a specular component. Using pre or post-manufacturing processes, the diffusion film can be selectively "turned on" or "turned off" meaning the areas can be diffuse, or specular. The edge printing typically done on back diffusers for LCD can be replaced by creating a specular edge around the film, thus directing the light specularly instead of reflecting it thus creating a brighter display. The specular areas of the film can also form patterns and text. Films with areas of specular and diffuse light transmittance can also be used as overhead projection films where the diffuse areas show up as darker areas on the display and the specular areas show up as bright areas on the display. The light diffuser where specular areas of the film are colored are preferred. This can create colored areas of specular patterns, text, images, and graphics. Films with areas of colored specular and non-colored diffuse light transmittance can be used as overhead projection films where the diffuse areas show up as darker areas on the projection display and the specular areas show up as bright colored areas on the display. This creates a colored projection film that has increased contrast to be viewed in room light conditions without the need to turn the ambient light down.

The preferred light diffuser has a diffusion efficiency variation of at least 10% less diffusion efficiency on the edges of the diffusion film than the center of the film. At the edge of a liquid crystal display, some of the light that is diffused is lost as it is deflected away and off the device. By making the edge of the display less diffuse than the center, less of the light is lost off of the display and the result is a brighter display. This can reduce or eliminate the need for edge printing on the diffusion film.

A light diffusion film having a top and bottom surface comprising a plurality of convex or concave complex lenses on the surface of the base is preferred. Curved concave and convex polymer lenses have been shown to provide very efficient diffusion of light. Further, the polymer lenses of the invention are transparent, allowing a high transmission of light allowing the brightness of LC displays to emit more light. Further, the complex lenses can be altered in design or a post processing method to achieve a macro diffusion efficiency variation.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the base.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the base and a radius of curvature relative to second axis (y) parallel to the base and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. There are at least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device. Further, the diffusion efficiency and diffusion variation can vary from one side of the diffusion film to the other side. This enables the one diffusion sheet to have two different macro diffusion variations or gradients (one on each side) achieving a more customized film. For example, the side of the diffusion film closer to the light source can have a diffusion gradient for more course diffusion and the opposite side (away from the light source) can have more fine diffusion structures with more complex patterns and gradients' to achieve the overall variable diffuser desired.

Preferably, the concave or convex lenses have an average frequency in any direction of from 5 to 250 complex lenses/mm. When a film has an average of 285 complex lenses/mm, creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light diffuser has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

The convex or concave lenses preferably have a height/diameter ratio of from 0.03 to 1.0. A height/diameter ratio of less than 0.01 (very wide and shallow lenses) limits diffusion because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of from 0.25 to 0.48. It has been found that the most efficient diffusion occurs in this range.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred are from 5 to 18 minor lenses per major lens. This range has been shown to produce the most efficient diffusion.

The preferred diffuse light transmission of the light is greater than 50%. Diffuser light transmissions less than 45% do not let a sufficient quantity of light pass through the diffuser, thus making the diffuser inefficient. A more preferred diffuse light transmission of the lenslet film is at least 80 typically from 80 to 95%. An 80% diffuse transmission allows an LC device to have improved battery life and increased screen brightness. The most preferred diffuse transmission of the base is at least 92%. A diffuse transmission of 92% allows diffusion of the back light-source and maximizes the brightness of the LC device significant improving the image quality of an LC device for outdoor use where the LC screen must compete with natural sunlight.

Preferably, the concave or convex lenses are semispherical meaning that the surface of each lenslet is a sector of a sphere, but not necessarily a hemisphere. This provides excellent even diffusion over the x-y plane. The semispherical shaped lenses scatter the incident light uniformly, ideal for a backlit display application where the display area needs to be lit uniformly. In another embodiment of the invention, the concave or convex lenses are aspherical meaning that width of the lenses differ in the x and y direction. This scatters light selectively over the x-y plane. For example, a particular x-y aspect ratio might produce an elliptical scattering pattern. This would be useful in the front of a LC display, spreading the light more in the horizontal direction than the vertical direction for increased viewing angle.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the polymeric support comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the invention, the polymeric support comprises a carbonate repeating unit. Polycarbonates have high optical transmission values compared to polyolefin polymers and therefore can improve the brightness of display devices.

In another embodiment of the invention, the polymeric support comprises an olefin repeating unit. Polyolefins are low in cost and have good strength and surface properties.

In another embodiment of the invention the polymeric support comprises a cellulose acetate. Tri acetyl cellulose has both high optical transmission and low optical birefringence allowing the diffuser of the invention to both diffuse light and reduce unwanted optical patterns.

The thickness of the light diffuser preferably is not more than 250 micrometers or more preferably from 12.5 to 100 micrometers. Current design trends for LC devices are toward lighter and thinner devices. By reducing the thickness of the light diffuser to not more than 250 micrometers, the LC devices can be made lighter and thinner. Further, by reducing the thickness of the light diffuser, brightness of the LC device can be improved by reducing light transmission. The more preferred thickness of the light diffuser is from 12.5 to 100 micrometers which further allows the light diffuser to be conveniently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble. A light diffuser with an impact resistance greater than 0.6 GPa is preferred. An impact resistance greater than 0.6 GPa allows the light diffuser to resist scratching and mechanical deformation that can cause unwanted uneven diffusion of the light causing "hot" spots in an LC device.

The light diffuser of the present invention can be produced by using a conventional film-manufacturing facility in high productivity. The invention utilizes a voided thermal plastic layer containing microvoids. Microvoids of air in a polymer matrix are preferred and have been shown to be a very efficient diffuser of light compared to prior art diffuser materials which rely on surface roughness on a polymer sheet to create light diffusion for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduced thus extending the life of a battery. Further, the microvoided diffuser film can be altered pre or post manufacturing to achieve the macro diffusion efficiency variation.

Since the microvoids of the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

The light diffuser is preferably a surface diffuser. A surface diffuser is easily altered in pre and post-manufacture processes to achieve a macro diffusion efficiency variation. Further, a surface diffuser utilizes with its rough surface exposed to air, affording the largest possible difference in index of refraction between the material of the diffuser and the surrounding medium and, consequently, the largest angular spread for incident light and very efficient diffusion.

In another embodiment of the invention, a bulk diffuser is preferred. A bulk diffuser can be manufactured with a macro diffusion efficiency variation, or can be subjected to a post-manufacturing process to produce the variation. Further, the bulk diffuser relies on index of refraction changes through the film, not needing an air interface to work efficiently.

The light diffuser comprising a surface microstructure is preferred. A surface microstructure is easily altered in design of the surface structures and altered in a post-manufacture process to achieve a macro diffusion efficiency variation. Microstructures can be tuned for different diffusion efficiencies and how much they spread light. Examples of microstructures are a simple or complex lenses, prisms, pyramids, and cubes. The shape, geometry, and size of the microstructures can be changed to accomplish the desired diffusion change. A surface diffuser utilizes with its rough surface exposed to air, affording the largest possible difference in index of refraction between the material of the diffuser and the surrounding medium and, consequently, the largest angular spread for incident light and very efficient diffusion.

There are two main ways to produce a variable diffusion film, either a pre-manufacturing or a post-manufacturing process step.

Post-manufacturing, the lenses on the complex lens diffuser, voids in the bulk voided diffuser, or surface texture on a surface diffuser can be altered using heat and/or pressure. The process where a heat and/or pressure gradient or pattern is preferred to produce a variable diffusion film. When heat is applied to a polymeric film, the polymer diffusion element partially or fully melts and cools to form a new structure. In the case of the complex lens surface diffuser, heat will melt the lenses (which are made by a thermoplastic) and will reform to create new shaped lenses or a smooth polymer surface. This smooth polymer film allows light to pass through specularly. Heat is a way to selectively turn parts of the diffuser sheet into a partially diffuse or specular sheet and can be applied in a very precise way to create specular dots, lines, patterns, and text. Heat applied to a voided polymer diffuser will melt the polymer and close the voids to the extent at which the heat is applied. The voids can be partially melted and less diffuse, or melted completely creating a specular region in the bulk voided diffuser.

Pressure can also be used to modify the diffusion properties on selective areas of the diffusion film. Post-manufacturing, the lenses on the complex lens diffuser, voids in the bulk voided diffuser, or surface texture on a surface diffuser can be altered using pressure. The process pressure gradient or pattern is preferred to produce a variable diffusion film. When pressure is applied to a polymeric film, the polymer diffusion element partially or fully compresses to form a new structure. In the case of the complex lens surface diffuser, the pressure will compress the lenses (which are made by a thermoplastic) and will reform them to create new flatter lenses (partially diffuse) or a smooth polymer surface (specular). This smooth polymer film is almost all specular. The amount of pressure needed to alter the diffusion elements depends on the materials (polymer) used and the thickness of the diffuser. Pressure is a way to selectively turn parts of the diffuser sheet into a specular sheet and can be applied in a very precise way to create specular dots, lines, patterns, and text. Pressure applied to a voided polymer diffuser will compress the polymer and close the voids depending on how much pressure is applied. The voids can be partially closed and less diffuse, or closed completely creating a specular region in the bulk voided diffuser. Post-manufacture, heat and pressure together or separately can selectively alter the diffusion characteristics of the diffusion films varying from diffuse to specular.

An example of a post-manufacturing process is using a thermal print head (heat and pressure) to melt the low $T_g$ complex lenses on a complex lens diffuser. As the printer prints, with just a carrier sheet with no coloration dyes or pigments, the printer head heats the polymer sheet and supplies pressure to deform or completely melt the complex lens. The resolution of the areas of diffuse, semi-diffuse and specular depends on the resolution of the print head.

Pre-manufacturing processes that can alter the diffusion characteristics of diffusion films selectively with respect to location by changing the diffusion elements, such as, lenses on the complex lens diffuser, voids in the bulk voided diffuser, or surface texture on a surface diffuser are preferred. Pre-manufacturing processes to alter diffusion efficiencies of complex lenses are changes in the size, aspect ratio, frequency and complexity of the complex lenses. This is achieved by changing the complex lens pattern on the master chill roll. The chill roll is produced from bead or particle blasting and then chroming. Varying the bead or particle blasting (size, number of particles, velocity of particles, etc) or by varying the chroming process selectively on the chill roll surface produces a master chill roll with macro diffusion efficiency variation. This variation can be from the most diffusion all the way to no diffusion where a specular region of the film would be produced. (To produce a specular region in the film the chill roll would be flat or have no surface structure to it.) This pre-manufacturing process can create diffusion gradients, patterns, or even text.

Pre-manufacturing processes can alter the diffusion characteristics of voided diffusion films selectively with respect to location by changing the diffusion elements voids in the bulk voided diffuser. Thickness of the voided layer and void attributes are two parameters to change the diffusion efficiency in the voided diffuser versus distance. The voided layer thickness can be extruded in varying thickness across the diffuser sheet or can be stretched more in selective areas than others. These thickness differences cause macro diffusion efficiency variation. Void characteristics can also be altered pre-manufacturing to develop diffusion efficiency changes. For example, the size of the void initiating bead can vary from location to location causing different sized voids. The concentration of void initiating beads can also be tailored around the diffuser sheet to create more voids in certain areas than other areas.

In other surface diffusers, the pattern on the master roll can be tailored in selective areas to create more diffuse and more specular areas. In the case of beads coated in a matrix, the beads that are coated could vary in size or concentration. For example, while coating, larger beads could be pumped into the coating station, or a gradient of sizes or concentrations of beads could be coated across the web creating a diffusion efficiency gradient.

The method of applying color to a macro efficiency variation film comprising color transfer is preferred. The methods of applying color comprising ink jet printing and flexo, gravure, and screen printing are preferred. Flexo, gravure, and screen printing and inkjet printing have a large color gamut and are quickly and easily applied to the variable diffuser film. Printing and inkjet do not apply heat or pressure so that applying the colorant does not change the diffusion characteristics of the film. This is advantaged because the diffusion element can be altered either pre or post-manufacture and then colored selectivity with varying colors and densities. Preferably, electrophotography applies color to the variable diffusion efficiency film. In another embodiment, thermal dye sublimation to apply color to the variable diffusion efficiency film is preferred. Electrophotography and thermal dye sublimation are preferred because the act of adding color to the film can alter the diffusion elements and the diffusion characteristics, by adding heat and pressure while printing. Adding color and changing the diffusion characteristics of the diffusion film can be accomplished in one step thereby eliminating the need for a separate diffusivity alteration step thereby saving manufacturing time and money. Furthermore, electrophotography and thermal printing have a large color gamut and are quickly and easily applied to a variable diffuser film.

An example of creating a colored diffusion element is using a thermal print head with a carrier sheet containing coloration dyes or pigments. The printer head heats the polymer sheet and supplies pressure to transfer the colored element.

A media comprising a colored macro diffusion efficiency variation that forms graphics, text, or images is preferred. This media could be, for example: a commercial backlit display application, signage, or a greeting card. Combining variable diffusion with variable selective coloration creates a unique display media. For example, a greeting card could have green specular lettering on a neutral diffuser with red and green shapes surrounding the text. Currently in the art, printing colors on a diffusion film could not change the variable diffuser, whereas in the invention, one can create areas of specular coloration in the diffuser.

FIG. 1 illustrates a cross section of a variable light diffusion film suitable for use in a liquid crystal display device. Colored variable light diffusion film 12 comprises transparent polymer base 20, onto which major lenses 22 are applied to the surface of transparent polymer base 26. Minor lenses 24 are on the surface of the major lens 22. The complex lens 30 remains intact after diffusivity alteration and coloration. Flattened complex lens 32 has been flatted due to heat and pressure in the process of applying yellow coloration 34. Yellow coloration 34 is on the surface of flattened complex lens 32. These variations in the geometry and number of minor lenses per major lens, along with frequency of complex lenses, produce the macro diffusion efficiency variation. The invention comprises a plurality of minor lenses 24 on the surface of the major lens 22. The light diffuser of the invention contains many diffusion surfaces from the major lens 22 and the minor lenses 24.

Figure 2:
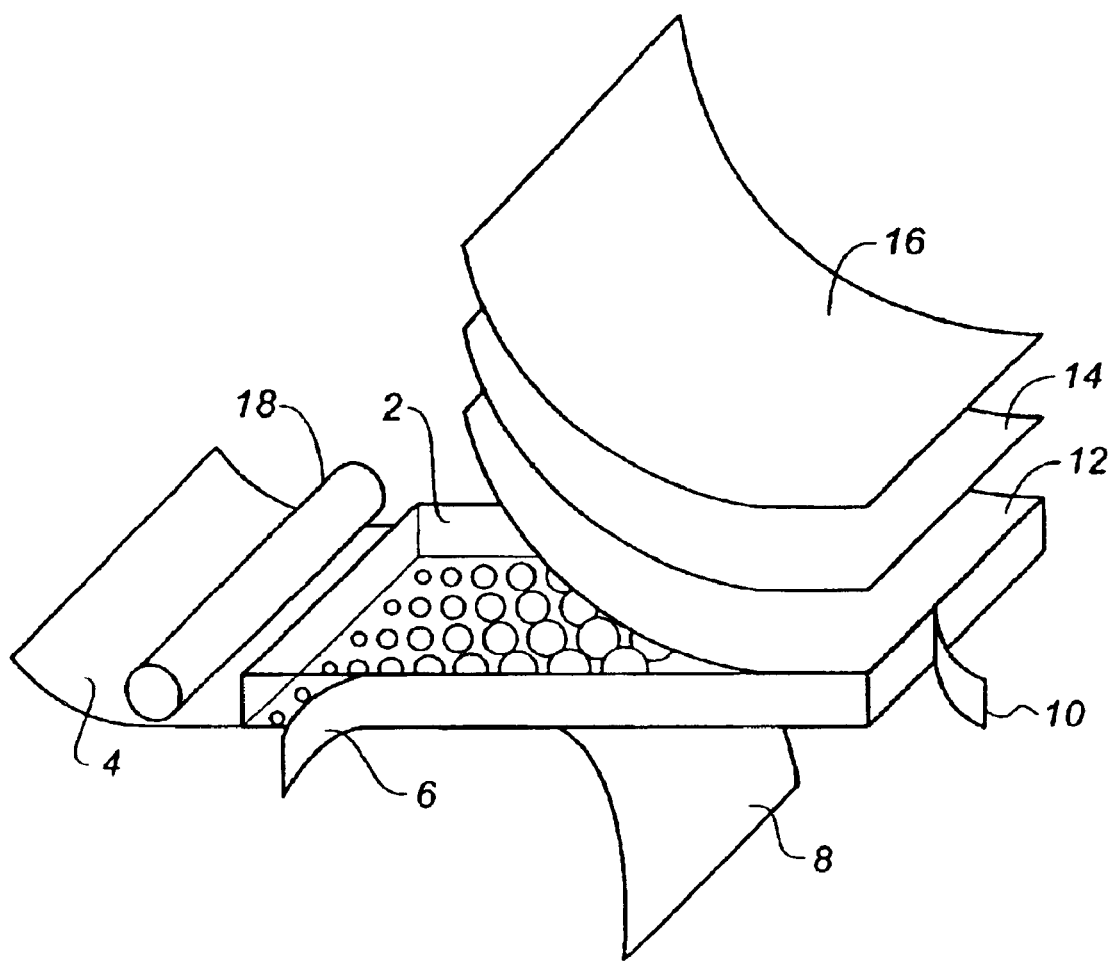
FIG. 2 illustrates a liquid crystal display device with a colored variable diffusion complex lens polymer light diffuser.

FIG. 2 illustrates a liquid crystal display device with a colored variable light diffusion film 12. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. The colored variable light diffusion film 12 is utilized to diffuse light energy exiting the light guide in a direction perpendicular to the light diffuser. Brightness enhancement film 14 is utilized to focus the light energy into polarization film 16. The colored variable light diffusion film 12 is in contact with brightness enhancement film 14.

Figure 3:
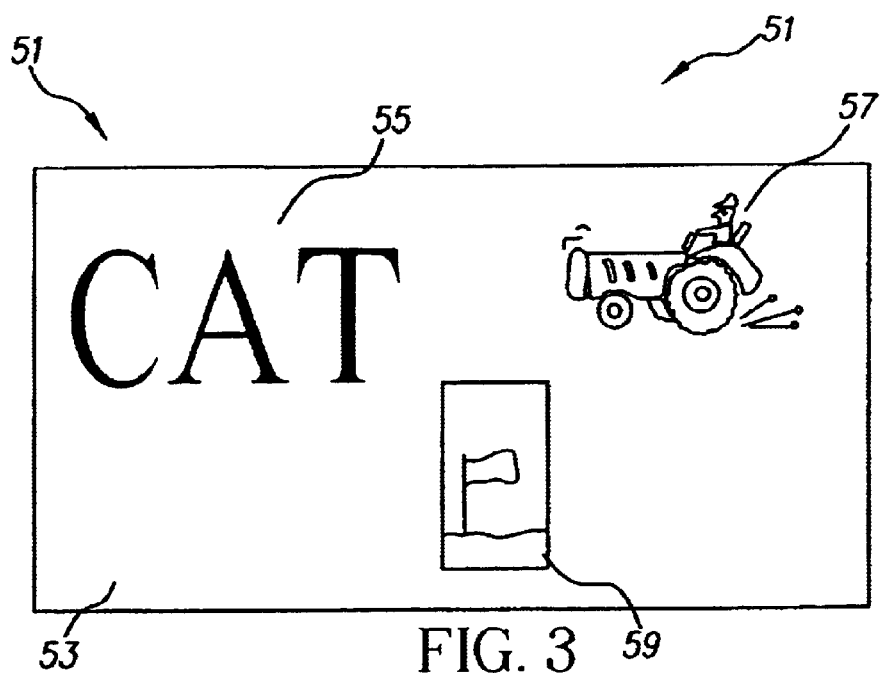
FIG. 3 illustrates a printed projection media with specular transmission in the form of text, graphics, and images.

FIG. 3 shows a schematic of a printed projection media comprising text, graphics, and images. The unprinted areas 53 of the printed projection media 51 contain light diffusing elements. The text 55, graphic 57, and image 59 are areas of specular transmission. These areas of specular transmission may be colored.

Figure 4:
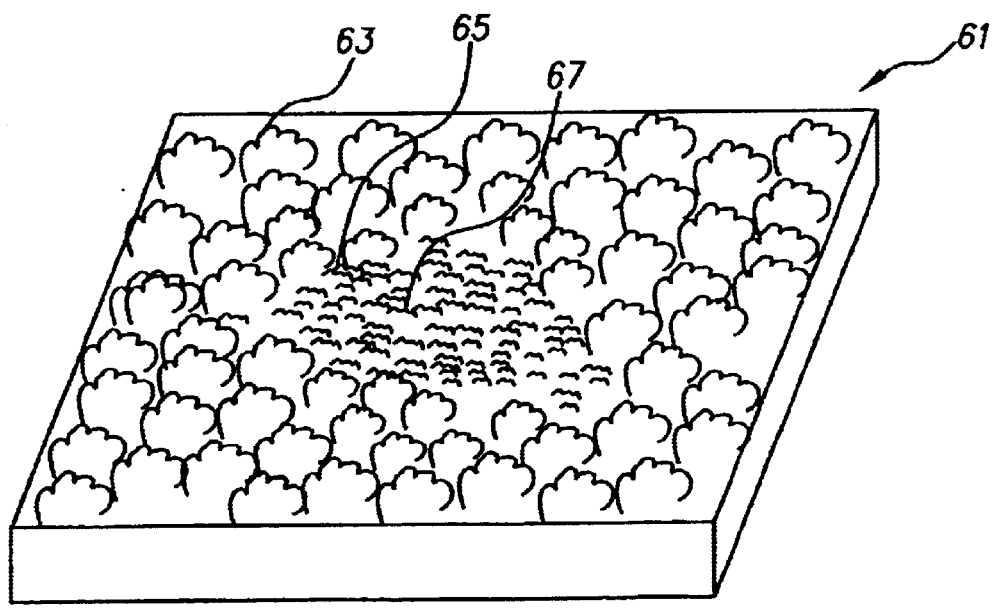
FIG. 4 is a schematic of a film with diffusion efficiency variation having iso-efficiency areas that exhibit an elliptical pattern.

FIG. 4 shows a schematic of a film with diffusion efficiency variation with iso-efficiency areas that exhibit an elliptical pattern 61, 63, 65, and 67 show areas of iso-diffusion efficiency that are elliptical in nature. In this figure, the outer area of the film are the most diffuse and become less diffuse towards the center of the film.

Figure 5:
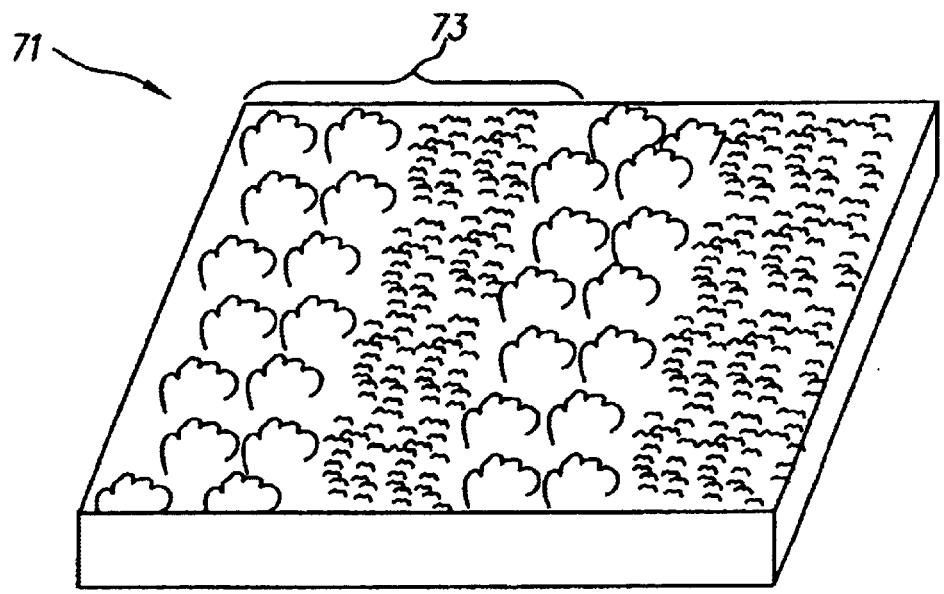
FIG. 5 is a schematic of a film with diffusion efficiency variation having a repeating pattern.

FIG. 5 shows a schematic of a film with diffusion efficiency variation comprising a repeating pattern. The film with diffusion efficiency variation comprising a repeating pattern 71, comprises a pattern of diffusion efficiency variation 73.

Figure 6:
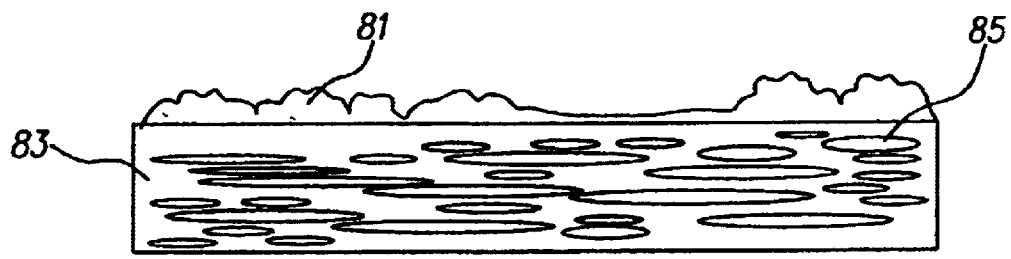
FIG. 6 is a schematic of a film with a diffusion efficiency variation and a microvoided polymer sheet.

FIG. 6 shows a schematic of a cross-section of the film with complex lenses with a diffusion efficiency variation and a microvoided polymer sheet. Complex lenses with macro diffusion efficiency variation 81 is on a microvoided polymer sheet 83. The microvoided polymer sheet 83 contains voids 85.

Figure 7:
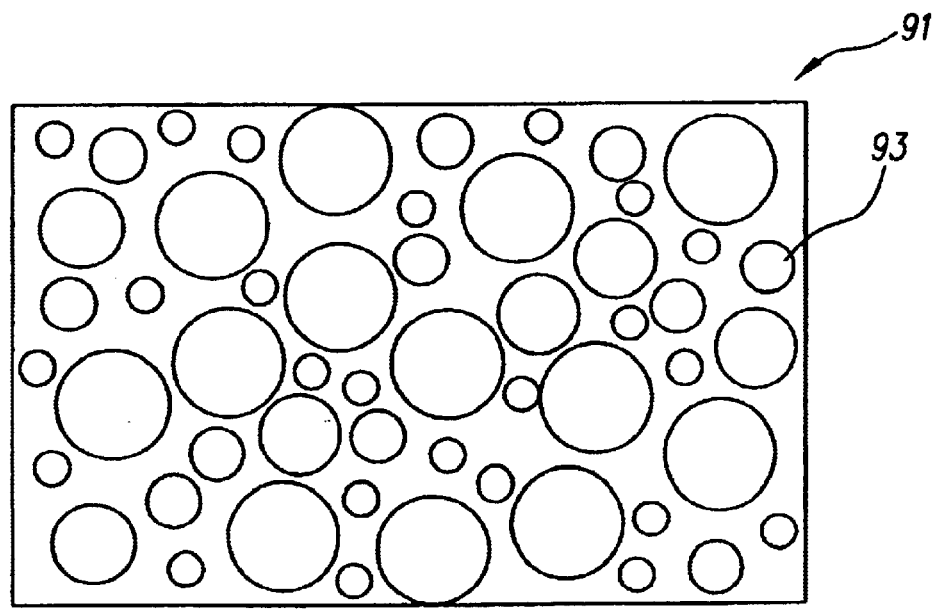
FIG. 7 is a schematic of a top view of a bisected microvoided sheet.

FIG. 7 shows a schematic of a top view of a bisection of the microvoided polymer sheet 91. The microvoided sheet contains circular voids 93.

For the light diffuser of the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758, 462 and 4,632,869, the disclosure of which is incorporated for reference. The light diffuser film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer. A polymer sheet having a percent transmission greater than 65%.

The light diffuser of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers, followed by biaxial orientation, whereby voids are formed around void-initiating material contained in the thin layers.

Polyester microvoided light diffusers are also preferred as oriented polyester has excellent strength, impact resistance and chemical resistance. The polyester utilized in the invention should have a glass transition temperature between about 50 degree. C. and about 150 degree. C., preferably about 60–100 degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to the microvoided polyester diffusion sheet that may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

Addenda are preferably added to a polyester skin layer to change the color of the imaging element. Colored pigments that can resist extrusion temperatures greater than 320 degrees Celsius are preferred, as temperatures greater than 320 degrees Celsius are necessary for co-extrusion of the skin layer.

The polyester light diffuser may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after. manufacture of the film. Co-extruding the layers further simplifies the manufacturing process.

The light diffuser of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss, etc. The tacky adhesive is preferably those having a refractive index close to that of the oriented film to suppress the interfacial reflection loss of light.

The light diffusion of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The light diffuser may be mounted to a glass sheet for support.

The light diffuser of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or $\Delta$ metal oxide or a filler.

The light diffuser of the present invention usually have optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n * d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film, however, it is preferably 50 nm or more.

The microvoid-containing oriented film of the present invention has a function to diffuse the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission. "Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape which is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Microvoids formed from organic spheres are preferred because they are low in light scattering, have been shown to form substantially circular voids and are easily dispersed in polyester. Further, the size and the shape of the voided diffuser layer can be changed by proper selection of organic sphere size and amount. Microvoids that are substantially free of scattering inorganic particles is also preferred. Prior art voided polymer layers that use inorganic particles such as clay, $TiO_2$ and silica have been shown to unacceptably scatter visible light energy. Scattering light energy from the back light source reduces the efficiency of the display unit by scattering light energy away from the LC and back toward the light source. It has been shown that inorganic microvoiding particles can cause as much as 8% loss in transmitted light energy.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

The organic void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which include members selected from the group consisting of an alkenyl aromatic compound having the general formula $Ar—C(R)=CH_2$, wherein Ar represents an aromatic hydrocarbon radical, or an aromatic halohydrocarbon radical of the benzene series and R is hydrogen or the methyl radical; acrylate-type monomers including monomers of the formula $CH_2=C(R')C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2=CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof. Preferred crosslinked polymer beads have a mean particle size less than 2.0 micrometers, more preferably between 0.3 and 1.7 micrometers. Crosslinked polymer beads smaller than 0.3 micrometers are prohibitively expensive. Crosslinked polymer beads larger than 1.7 micrometers make voids that large and do not scatter light efficiently.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization and limited coalescence directly yield very uniformly sized particles. U.S. Pat. No. 6,074,788, the disclosure of which is incorporated for reference. It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

The microbeads of cross-linked polymer range in size from 0.1–50 $\mu$m, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads.

The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of films to the uniaxial orientation of microvoided films. Balanced microvoids are largely circular in the plane of orientation. The size of the microvoids and the ultimate physical properties depend upon the degree and balance of the orientation, temperature and rate of stretching, crystallization kinetics, the size distribution of the microbeads, and the like. The film supports according to this invention are prepared by: (a) forming a mixture of molten continuous matrix polymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and beat sealability. The specific matrix composition can be tailored to meet many product needs. The complete range from crystalline to amorphous matrix polymer is part of the invention.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The light diffuser of the invention may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The invention can also include, in another aspect, one or more optical coatings to improve optical transmission through one or more lenslet channels. It is often desirable to coat a diffuser with a layer of an anti-reflective (AR) coating in order to raise the efficiency of the diffuser.

In the manufacturing process for the complex lens light diffuser films of the present invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a base.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched poly-vinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The colored variable diffusion film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The diffuser film of the present invention can even the lightness of a liquid crystal display device across the display because the film can vary to compensate for the brightness near the light source and less light intensity away from the light source. The variable colored light diffusers also have excellent light-scattering properties to expand the light to give excellent visibility in all directions. Although the above effect can be achieved even by the single use of such variable diffuser film, plural number of films may be used in combination. The variable diffuser film may be placed in front an LCD to disburse light from the display further and make it much more homogenous across the display.

The variable diffuser of the present invention can replace the dot printing on the wave guide in an LCD and at the same time correct the light source to create a neutral illuminate for the LCD. The wave guide is typically a thick (approx half a centimeter) piece of acrylic designed to guide the light from the light sources out at a normal to the display and to even the light from the back lights across the display. The evening of brightness is produced by a dot pattern printed on the back side (the side facing the reflector) of the wave guide. The dot pattern varies in size across the display to try to direct more light out of the wave guide in the away from the light sources and less light out of the display near the light sources. This printing is a very costly and time consuming because each wave guide is screen printed individually, not like the roll to roll process of the current invention. Having a variable diffuser with a diffusion gradient (more diffusion near the light source and less away from it) on top of the wave guide eliminates the need for the screen printed dots thus eliminating a processing step and saving manufacturing time and money. It has been shown that selective coloration of the variable diffuser creates an even color tone across the display. For example, a display might have a red tint to it and the desire is to have a neutral display. The diffuser for the light source would nee to have a cyan component to it, higher in density close to the light source and lower in density away from the light to create an even color across the display. Using colored variable diffusers displays can be fabricated with even illumination and color across the display.

The colored variable diffuser can display text, shapes, and images in varying amounts of diffusion or specular areas and different colors surrounded by diffuse regions. These colored variable diffusers can be used in displays and as overheads. As overheads the colored variable diffuser has added utility. In an unexpected result, when the colored variable diffuser was placed on an overhead projector, the diffuse areas were dark, and the specular areas were bright. This occurred because when the light from the light source in the overhead projector hit the diffuse areas of the diffuser sheet, the light was diffused and the focusing lens did not collect the light and the image projected was dark. The specular areas transmitted specular light producing bright areas on the display. Colored variable diffusion sheets, with there ability to produce colored text, shapes, and images with diffuse and specular areas, can be used as project materials to improve the contrast in the projected sheet allowing the display to be more easily read in a bright room and producing for an unusual display effect.

The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A colored variable diffuser film of the present invention placed between the light source and the detector can eliminate from the output of the light source any trace of the filament structure and therefore causes a homogenized output which is identical from light source to light source.

The colored variable diffuser films may be used to control lighting for stages by providing pleasing homogenized colored light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light and coloring light where it is needed. As a consequence, almost any object, moving or not, and of any shape, can be correctly illuminated.

The colored variable diffuser can be transformed into a reflection film or a transflector film by applying a reflection layer composed of a metallic film, etc., to the colored variable diffuser film of the present invention can be used e.g. as a retroreflective member for a traffic sign. It can be used in a state applied to a car, a bicycle, person, etc. When the colored variable light diffuser is placed on a metallic film, it can cause the amount of reflection and diffusion reflection to vary across the film from diffuse to almost specular. This can create a reflection sign with sections diffuse and sections (such as text) as a mirror surface and have colored reflections. The surface of the colored variable diffuser can also be partially metallized as to create a colored variable diffusion transflector, an optical film in a LCD so that the LCD can be used in both reflection and transmission mode.

The colored variable diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

The light diffuser films of the present invention can also be used to homogeneously illuminate a sample under a microscope by destructuring the filament or arc of the source, yielding a homogeneously illuminated field of view. The light diffusion film can have colored variable diffusion, with a higher level of diffusion in front of the light source, and less diffusion in the areas around the light source. The light diffuser films may also be used to homogenize the various modes that propagate through a fiber, for example, the light output from a helical-mode fiber and color the light at the same time.

The colored variable diffuser films of the present invention also have significant architectural uses such as providing appropriate light for work and living spaces. In typical commercial applications, inexpensive transparent polymeric diffuser films are used to help diffuse light over the room. A colored variable diffuser of the present invention replaces one of these conventional uniform diffusers provides a more uniform light output so that light is diffused to all angles across the room evenly and with no hot spots and with a pleasing coloration.

The colored variable diffuser films of the present invention may also be used to diffuse light illuminating artwork. The colored variable diffuser provides a suitable appropriately sized and directed aperture for depicting the artwork in a most desirable fashion and in the correct lighting color. For example, adding a colored variable diffuser can transform fluorescent colored light into sunlight colored light thereby illuminating the artwork correctly.

Further, the colored variable diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The colored variable diffuser film of the present invention can be used as an electrode by laminating a transparent conductive layer composed of indium oxide represented by ITO film. If the material is to be used to form a reflective screen, e.g. front projection screen, a light-reflective layer is applied to the diffuser.

Another application for the variable diffuser film is a rear projection screen, where it is generally desired to project the image from a light source onto a screen over a large area. The viewing angle for a television is typically smaller in the vertical direction than in the horizontal direction so variable diffusion across the display can control the viewing angle and brightness across the display. It would be desirable to have the screen have a color tint for increased contrast.

Embodiments of the invention may provide not only improved selective coloration light diffusion and transmission but also a diffusion film of reduced thickness, and that has reduced light scattering tendencies.

The entire contents of the patents and other publications referred to in this specification are incorporated herein by reference.

EXAMPLE

In this example, the colored variable light diffusion efficiency film of the invention was created by extrusion casting an extrusion grade polyolefin polymer against a pattered chill roll containing a varying complex lens geometry. The patterned polyolefin polymer, in the form the complex lens was then transferred to a polyester web material thereby forming a light diffuser with complex surface lenses. This example will show that varying size, geometry, and complexity complex surface lenses formed on a transparent polymer web material and selective coloration will produce colored variable diffusion across a diffusion film providing exceptional colored variable light diffusion. Further, it will be obvious that the light diffuser will be low in cost and have mechanical properties that allow for insertion into LC devices.

A patterned chill roll (complex lens geometry) was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex. The single lens patterned roll (control) was manufactured by starling with a copper roll blank and grit blasted with size 14 spherical grit at a pressure of 310 MPa. The resulting single lenses on the surface of the roll were concave.

The patterned chill roll was utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 $g/m^2$.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The structure of the cast coated diffusion sheets is as follows,
Formed polyolefin lenses
Transparent polyester base The diffusion film was them post-manufacture colored and the diffusivity was changed selectively. The film was printed using thermal dye sublimation. The thermal print head applied heat and pressure to melt the lenses and apply the yellow colorant from the thermal color donor. The heat and pressure melted the lenses causing an almost completely specular transmission area in the film and at the same time, colored the specular area yellow. The printed feature was a 100% yellow mostly specular specular square 2 cm in length and width, though the feature could have been any color and any size, shape, or amount of diffusion.

The variable diffusion film containing complex polymer lenses from above were measured for % light transmission and % diffuse light transmission, diffuse light transmission efficiency, a*, and b*. a* is a measure of the redness or greenness and is expressed as single number, which is positive if the color is red and negative if the color is green. Similarly, yellowness or blueness is expressed by b*, which is positive for yellow and negative for blue. The larger the absolute value is for the a* and b*, the more colored the film is. The a* and b* values of the films were measured using a CIElab calorimeter with an 1964 observer and a D65 illuminate.

The colored variable diffusion film was measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. The term "diffusion efficiency" means the ratio of % diffuse transmitted light at 500 nm to % total transmitted light at 500 nm multiplied by a factor of 100, as known as haze in the art. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention are listed in Table 1 below.

TABLE 1

| Colored Variable Diffuser | Outside the yellow printed square | In the yellow printed square |
|---|---|---|
| Total transmission at 500 nm | 87.2% | 90.2% |
| Diffuse transmission at 500 nm | 74.7% | 11.5% |
| Diffuse transmission efficiency at 500 nm | 85.7% | 12.7% |
| a* | 0.05 | 0.2 |
| b* | 0.1 | 6.2 |

As the data above clearly indicates, the variable diffusion complex polymer lenses formed on the surface of a transparent polymer provides tailored colored variable light diffusion and % transmission allowing for brighter liquid crystal display devices and product differentiation. From the unprinted area of the film to the yellow printed specular area of the film the percent total transmission changed 3.4%, the diffuse transmission changed 84.6%, and the diffuse transmission efficiency changed 85.2%. The a* value increased 0.15 and the b* value increased 6.1.

This example could be utilized as a colored variable diffuser for an application where selective areas of a backlit display have a static, colored element. On example of this could be an LCD (ex. cell phone, PDA) where the manufacturer's name or icon would be displayed in a different color in the same area of the display at all times when the device is on. The LCD would have neutral colored illumination across the display except where the name or icon would be colored specular light so it will be easily seen. This prevents tampering and rebranding the LCD because the manufacturer's name is imbedded in the display and can not be removed without taking the entire device apart and destroying it. It can also be used to create backlit displays with unique and customizable colors and diffusivities. Theses colors can selectively color and diffuse different parts of the display for example a cell phone with the battery indicator always being blue and the phone numbers are displayed in red coloring.

The colored variable diffuser can display text, shapes, and images in varying amounts of diffusion or specular areas and different colors surrounded by diffuse regions. These colored variable diffusers can be used in displays and as overheads. As overheads the colored variable diffuser has added utility. In an unexpected result, when the colored variable diffuser was placed on an overhead projector, the diffuse areas were dark, and the specular areas were bright and could be colored. This occurred because when the light from the light source in the overhead projector hit the diffuse areas of the diffuser sheet, the light was diffused and the focusing lens did not collect the light and the image projected was dark. The specular areas transmitted specular light producing bright colored areas on the display. Colored variable diffusion sheets, with there ability to produce colored text, shapes, and images with diffuse and specular areas, can be used as project materials to improve the contrast in the projected sheet allowing the display to be more easily read in a bright room and producing an unusual display effect.

This colored variable diffusion film example would be utilized in a back lit display to even out the color and illumination of the backlight across the display. The film would most likely require a gradient of diffusion and color, as to not be se by the viewer. The percent total light transmission would increase and diffuse light transmission would decrease from the center of the roll to the edge of the roll. The film would be more diffuse and less transparent in the center of the display where the light is located, to compensate for the light intensity of the light bulb. Towards the edge of the film and display, away from the light source, more light passes through the film and the light is diffused less to create an even light intensity across the entire display. This tailoring of the diffusion film to the back lit display enables a brighter display. The diffuser with tailored of total and diffuse transmission of the roll across the roll can deliver more light intensity and more uniform light to the viewer. It has been shown that selective coloration of the variable diffuser creates an even color tone across the display. For example, a display might have a red tint to it and the desire is to have a neutral display. The diffuser for the light source would nee to have a cyan component to it, higher in density close to the light source and lower in density away from the light to create an even color across the display. Using colored variable diffusers displays can be fabricated with even illumination and color across the display.

Further, because the invention materials were constructed on an oriented polyester base, the materials have a higher elastic modulus compared to cast diffuser sheets. The oriented polymer base of the example allow for the light diffuser to be thin and therefore cost efficient and light as the materials content of the example materials is reduced compared to prior art materials.

While this example was primarily directed toward the use of thermoplastic light diffusion materials for LC devices, the materials of the invention have value in other diffusion applications such as back light display, imaging elements containing a diffusion layer, a diffuser for specular home lighting and privacy screens, imaging media, and greenhouse light diffusion.

Parts List

2; Light guide
4; Lamp Reflector
6; Reflection tape
8; Reflection film
10; Reflection tape
12; Colored variable light diffusion film
14; Brightness enhancement film
16; Polarization film
18; Visible light source
20; Transparent polymer base
22; Major lens
24; Minor lens
26; Surface of transparent polymer base
30; Complex lens
32; Flattened complex lens
34; Yellow colorant
51; Printed projection media
53; Unprinted area
55; Text
57; Graphic
59; Image
61; Film with diffusion efficiency variation with iso-efficiency areas that exhibit an elliptical pattern
63; Elliptically shaped area of iso-diffusion efficiency
65; Elliptically shaped area of iso-diffusion efficiency
67; Elliptically shaped area of iso-diffusion efficiency
71; Film with diffusion efficiency variation comprising a repeating pattern
73; Pattern of diffusion efficiency variation
81; Complex lenses with macro diffusion efficiency variation
83; Microvoided polymer sheet
85; Circular voids
91; Bisection of microvoided polymer sheet
93; Circular voids

What is claimed is:

1. A light diffuser polymeric film comprising a macro diffusion efficiency variation of greater than 5% over an in plane distance of at least 2 cm using an integrating sphere with a light entry port of 25.4 mm diameter, the diffuser having a total light transmission of at least 80% and wherein at least part of the diffuser is selectively colored.

2. The light diffuser of claim 1 wherein said color has a density of greater than 0.2.

3. The light diffuser of claim 1 wherein specular areas of said macro diffusion efficiency variation are colored.

4. The light diffuser of claim 1 wherein diffuse areas of said macro diffusion efficiency variation are colored.

5. The light diffuser of claim 1 wherein gradient areas of said macro diffusion efficiency variation are colored.

6. The light diffuser of claim 1 wherein said colored part of the diffuser comprises dye based colorants.

7. The light diffuser of claim 1 wherein said colored part of the diffuser comprises pigment based colorants.

8. The light diffuser of claim 1 wherein said colored part of the diffuser comprises fluorescent materials.

9. The light diffuser of claim 1 wherein said part of the diffuser corresponds to color wavelength band of from 10 to 70 nm.

10. The light diffuser of claim 1 wherein said colored part of the diffuser comprises text.

11. The light diffuser of claim 1 wherein said colored part of the diffuser comprises graphics.

12. The light diffuser of claim 1 wherein said colored part of the diffuser comprise an image.

13. The light diffuser of claim 1 wherein said part of the diffuser comprises chromatic transmission.

14. The light diffuser of claim 13 wherein the chromatic transmission comprises yellow light at 570 to 620 nm.

15. The light diffuser of claim 13 wherein the chromatic transmission comprises magenta light at 630 to 690 and 425 to 480 nm.

16. The light diffuser of claim 13 wherein the chromatic transmission comprises cyan light at 480 to 520 nm.

17. The light diffuser of claim 13 wherein the chromatic transmission comprises red light at 630 to 690 nm.

18. The light diffuser of claim 13 wherein the chromatic transmission comprises green light at 525 to 590 nm.

19. The light diffuser of claim 13 wherein the chromatic transmission comprises blue light at 425 to 480 nm.

20. The light diffuser of claim 1 wherein the diffusion efficiency varies more than 50 percent in two different locations of the diffuser.

21. The light diffuser of claim 1 wherein the diffusion efficiency variation comprises a gradient.

22. The light diffuser of claim 1 that is rectangular in shape wherein there is diffusion efficiency variation along a diagonal of the rectangle.

23. The light diffuser of claim 1 that is rectangular in shape wherein there is diffusion efficiency variation along the width or height.

24. The light diffuser of claim 1 wherein there is diffusion efficiency variation from the center to the perimeter.

25. The light diffuser of claim 1 wherein there is diffusion efficiency variation along the perimeter.

26. The light diffuser of claim 1 wherein the diffusion efficiency variation is such that iso-efficiency exhibits an elliptical pattern.

27. The light diffuser of claim 1 wherein the diffusion efficiency variation comprises a repeating pattern.

28. The light diffuser of claim 1 wherein the diffusion efficiency variation comprises a specular component.

29. The light diffuser of claim 1 wherein the diffusion efficiency variation provides values is at least 10% less on the edges than in the center of said light diffuser.

30. The light diffuser of claim 1 further comprising a base and a plurality of convex or concave complex lenses of the surface of said base.

31. The plurality of complex lenses of claim 30 wherein the said convex or concave complex lenses are randomly distributed on the surface of the base.

32. The plurality of complex lenses of claim 30 wherein said concave or convex complex lenses have an average width in the x and y direction of 3 to 60 microns.

33. The plurality of complex lenses of claim 30 wherein said concave or convex complex lenses have a height/diameter ratio of 0.03 to 1.0.

34. The light diffuser of claim 1 further comprising a microvoided polymer sheet.

35. The light diffuser of claim 34 wherein the microvoided polymer sheet comprises substantially circular voids.

36. The light diffuser of claim 1 wherein said light diffuser comprises a surface diffuser.

37. The light diffuser of claim 1 wherein said light diffuser comprises a bulk diffuser.

38. The light diffuser of claim 1 wherein said light diffuser comprises a base comprising a surface microstructure.

* * * * *